(12) United States Patent
Cross (10) Patent No.: US 11,512,603 B2
(45) Date of Patent: Nov. 29, 2022

(54) RING FASTENER (71) Applicant: CROSS MANUFACTURING COMPANY (1938) LIMITED, Bath (GB)

(72) Inventor: Edward Henry Cross, Bath (GB)

(73) Assignee: CROSS MANUFACTURING COMPANY (1938) LIMITED, Bath (GB)

( * ) Notice: Subject to any disclaimer, the term of this patent is extended or adjusted under 35 U.S.C. 154(b) by 0 days.

(21) Appl. No.: 17/612,701

(22) PCT Filed: May 15, 2020

(86) PCT No.: PCT/GB2020/051197
§ 371 (c)(1),
(2) Date: Nov. 19, 2021

(87) PCT Pub. No.: WO2020/234572
PCT Pub. Date: Nov. 26, 2020

(65) Prior Publication Data
US 2022/0268163 A1 Aug. 25, 2022

(30) Foreign Application Priority Data

May 20, 2019 (GB) ..................................... 1907097
Nov. 29, 2019 (GB) ..................................... 1917506

(51) Int. Cl.
*F01D 5/30* (2006.01)
(52) U.S. Cl.
CPC ........... *F01D 5/3007* (2013.01); *F01D 5/303* (2013.01); *F05D 2260/36* (2013.01)
(58) Field of Classification Search
None
See application file for complete search history.

(56) References Cited

U.S. PATENT DOCUMENTS 3,077,811 A * 2/1963 Moore .................. F01D 5/3015
416/220 A
5,302,086 A * 4/1994 Kulesa .................. F01D 5/3007
416/221

(Continued)

FOREIGN PATENT DOCUMENTS

DE      102008008983 A1    8/2009
EP          2096270 A1    1/2009

(Continued)

*Primary Examiner* — Kayla Mccaffrey
(74) *Attorney, Agent, or Firm* — Dickinson Wright PLLC; Andrew D. Dorisio (57) ABSTRACT

The present invention describes a ring fastener (10) comprising a discontinuous band (11) having a first end (14) and a second end (16). The first end (14) comprises a pair of spaced-apart elongate finger members (15a,15b) (having a first finger member (15a) and a second finger member (15b)), and the second end (16) comprises an elongate tongue member (17). The finger members (15a,15b) and the tongue member (17) are interlockable, such that when interlocked, the band (11) comprises a continuous circumference. The ring fastener (10) further comprises a closed configuration wherein the finger members (15a,15b) and the tongue member (17) are substantially aligned with a circumferential surface (13) of the band (11); and an open configuration wherein the first finger member (15a) is radially and/or axially deflected from its substantially aligned position, so that it is angled with respect to the circumferential surface (13) of the band (11). The invention also describes a method of assembling a bore (40) and a component (42), and the use of such an assembly.

18 Claims, 8 Drawing Sheets

(56) References Cited

U.S. PATENT DOCUMENTS

| | | | |
|---|---|---|---|
| 9,404,373 B2* | 8/2016 | Kimura | F01D 5/326 |
| 10,415,401 B2* | 9/2019 | Wadsworth | F01D 5/3023 |
| 2005/0232760 A1 | 10/2005 | Wagner | |
| 2012/0087798 A1 | 4/2012 | Roman-Morales et al. | |
| 2012/0198858 A1 | 8/2012 | Rabe et al. | |
| 2013/0323052 A1 | 12/2013 | Zhang et al. | |

FOREIGN PATENT DOCUMENTS

| | | |
|---|---|---|
| EP | 3001044 A1 | 3/2016 |
| EP | 3244014 A2 | 3/2017 |
| GB | 2397854 A | 8/2004 |
| JP | S454098 Y1 | 2/1970 |
| JP | 2002048282 A | 2/2002 |
| JP | 2017525901 A | 9/2017 |

\* cited by examiner

RING FASTENER

FIELD OF INVENTION

This invention relates to a ring fastener, such as a retaining ring, a bore/component assembly comprising the ring fastener, and methods of assembling the same.

BACKGROUND TO THE INVENTION

Retaining rings can have many different applications, but are often used to secure components together, such as to secure two rotating parts together. For example, a retaining ring can be fitted into a groove on an internal surface of a bore, and can act as a shoulder to mount/secure a component to the bore.

An example of a retaining ring is a spiral retaining ring, which comprises a single turn band and a gap in the circumference of the ring. When installed, the ends of the ring are brought together and can be in contact. However, during use, any thermal expansion of the ring can cause the ends of the ring to move apart, thus opening up the gap. This type of retaining ring therefore does not provide reliable full circumference support for the components during use.

Some retaining rings overcome this problem by providing a two or more turn retaining ring, which does not comprise a gap. However, the material used to produce such a ring is much thinner than a single turn ring, and as such each ring does not provide sufficient torsional stiffness. This can result in the ring twisting during use, which can reduce the stability of the ring and its ability to effectively secure components together.

The present invention therefore aims to overcome at least one of the above disadvantages with the prior art. For example, the retaining ring of the present invention aims to provide reliable full circumference support during use, whilst also maintaining a stable and effective connection between two components.

SUMMARY OF THE INVENTION

Accordingly, in one aspect, the present invention provides a ring fastener comprising:

a discontinuous band having a first end and a second end;

the first end comprising a pair of spaced-apart elongate finger members, and the second end comprising an elongate tongue member;

wherein the finger members and the tongue member are interlockable, such that when interlocked, the band comprises a continuous circumference;

wherein the pair of spaced-apart elongate finger members comprises a first finger member and a second finger member; and, wherein the ring fastener further comprises:

a closed configuration wherein the finger members and the tongue member are substantially aligned with a circumferential surface of the band; and, an open configuration wherein the first finger member is radially and/or axially deflected from its substantially aligned position, so that it is angled with respect to the circumferential surface of the band.

In the open configuration the second end can be radially moveable relative to the first end to a position where the tongue member is located between the pair of elongate finger members. In the closed position, the first and second ends can be radially secured relative to each other.

The present invention provides a ring fastener, such as a retaining ring, comprising a single turn band. When in use, with the tongue member radially secured between the finger members, the position of the fingers prevent any movement of the ends of the band in a radial direction. Furthermore, any separation of the ends of the band due to expansion/contraction in use is accommodated by the interlocking nature of the fingers and tongue, such that the fingers/tongue will not disengage in use. Therefore, when the band is in use, for example being used to secure a component within a bore, the band provides complete (unbroken) 360 degree support for the component. The ring fastener of the present invention therefore provides a more reliable solution for securely mounting components within bores.

Furthermore, a single turn ring fastener is easier to manufacture compared to two or more turn fasteners. Single turn ring fasteners can also be manufactured with a larger axial thickness compared to two or more turn fasteners. Therefore the band of the present invention is stronger and less prone to deformation compared to two or more turn fasteners.

Moreover, single turn fasteners are easier to assemble in use compared to two or more turn fasteners, and as such they do not require any specialist equipment or skill to install.

The first finger member can be thinner than the second finger member, the tongue member and the band. A shoulder portion can be adjacent to the thinner first finger member and the first end of the band. A thinner radial and/or axial thickness makes it easier for the first finger member to be radially and/or axially deflected into the open configuration. Furthermore, when returning the band to the closed configuration, the deflected first finger member can be pushed passed the point where it is aligned with a circumferential surface of the band (known as over-bending). Advantageously, when the first finger member is then released, it can spring back to a position substantially aligned with a circumferential surface of the band.

A terminal end of the tongue member can have a chamfered portion. Such a chamfered surface can prevent the first finger member catching on the tongue member as they move radially relative to each other, to a position where the tongue member is located between the pair of elongate finger members. This makes it easier to assemble the ring fastener within a bore in use.

A recess can be defined between the pair of spaced-apart finger members. The tongue member can be receivable within the recess. When the finger members and the tongue member are interlocked, a gap can be defined between the terminal end of the tongue member located within the recess, and a base of the recess.

The length of each member can be configurable to accommodate a pre-determined range of relative movement, such that the tongue member can remain engaged in the recess over the range to maintain a complete band circumference.

The first finger member and the second finger member can be substantially the same length. In alternative embodiments, the first finger member and the second member can be different lengths. That is, the first finger member can be shorter than the second finger member. In use, a shorter length means that the terminal end of the first finger member can be deflected through a shorter distance, which can help to make the ring easier to install.

The radial width of the tongue member is typically less than the radial width of the band. As such, the tongue member can be radially flanked by shoulder surfaces between the tongue member and the second end of the band. In embodiments where the first and second finger members are substantially the same length, the shoulder surfaces can be aligned. Alternatively, in embodiments where the first and second finger members are different lengths, the shoulder surfaces can be circumferentially offset. Offsetting the shoulder surfaces can help to accommodate a pre-determined range of relative movement between the finger members and the tongue member.

The presence of the gap can help to ensure that the band maintains a complete (unbroken) 360 degree circumference in use, despite any fluctuations in the diameter of the band, for example due to temperature changes. The ring fastener of the present invention is therefore safer and more reliable compared to known ring fasteners, and can effectively support a component within a bore, in use.

The band can be substantially circular. The band can comprise a uniform profile, or cross-section. The ring fastener can be a retaining ring.

In a second aspect, the present invention provides an assembly comprising:

an elongate bore having a substantially circular cross-section, and a groove extending circumferentially around an inner surface of the bore;

a component located within the bore; and, wherein the ring fastener of the first aspect of the invention is received within the groove to secure the component axially relative to the bore.

In a third aspect, the present invention provides a method of assembling the bore and component of the second aspect of the invention, the method comprising the steps of:

axially or radially deflecting the first finger member from a position substantially aligned with a circumferential surface of the band; and, installing the band within the groove on the inner surface of the bore, by:

locating a second finger member within the groove;

radially moving the tongue member and the first finger member relative to each other, such that the tongue member is located between the first and second finger members; and, returning the first finger member to the position where it is substantially aligned with the circumferential surface of the band, to radially secure the tongue member between the first and second finger members.

Returning the first finger member to the position where it is substantially aligned with the circumferential surface of the band can include axially over-bending the first finger member.

In a fourth aspect, the present invention provides a use of the assembly of the second aspect of the invention, wherein in use:

the pair of spaced-apart finger members define a recess between them which receives the tongue member; and, wherein interlocking the finger members and the tongue member defines a gap between a terminal end of the tongue member located within the recess, and the base of the recess; and wherein the gap accommodates any relative circumferential movement between the tongue member and the finger members, such that the band maintains a complete circumference during use.

The relative movement can be caused by thermal expansion and contraction due at least in part to rotational movement of the bore and/or component located within the bore.

In a fifth aspect, the present invention provides a turbine assembly comprising:

a drum having a substantially circular cross-section, and having a plurality of discrete axially extending notches positioned equidistantly around an outer circumferential surface of the drum;

each notch being separated circumferentially around the drum by a first retaining portion located on a circumferential edge of the drum;

a turbine blade interlocked with each notch, such that each turbine blade is radially secured relative to the drum;

each turbine blade comprising a second retaining portion, each second retaining portion being positioned between adjacent first retaining portions, and aligned with the adjacent first retaining portions; and, wherein the ring fastener of the first aspect of the invention is received by the first and second retaining portions to secure the turbine blades axially relative to the drum.

The first and/or second retaining portions may be a lip. The first and/or second retaining portions may be a groove.

Whilst the invention has been described above, it extends to any inventive combination set out above, or in the following description or drawings.

BRIEF DESCRIPTION OF THE DRAWINGS

The invention can be performed in various ways, and an embodiment thereof will now be described by way of example only, with reference being made to the accompanying drawings, in which.

DETAILED DESCRIPTION OF EMBODIMENTS

The term "axial" as used herein is defined as a direction parallel to the rotational axis of the ring fastener. The term "radial" as used herein is defined as a direction perpendicular to the rotational axis of the ring fastener.

Figure 1A:
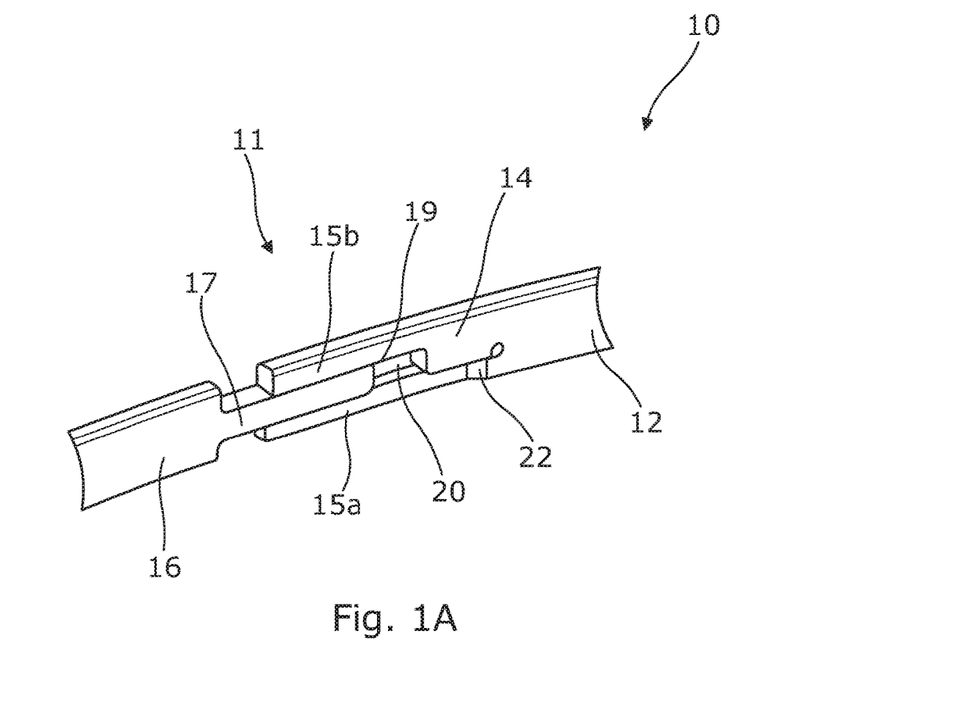
FIGS. 1A and 1B show a portion of an embodiment of a ring fastener in an interlocked position.
Figure 1B:
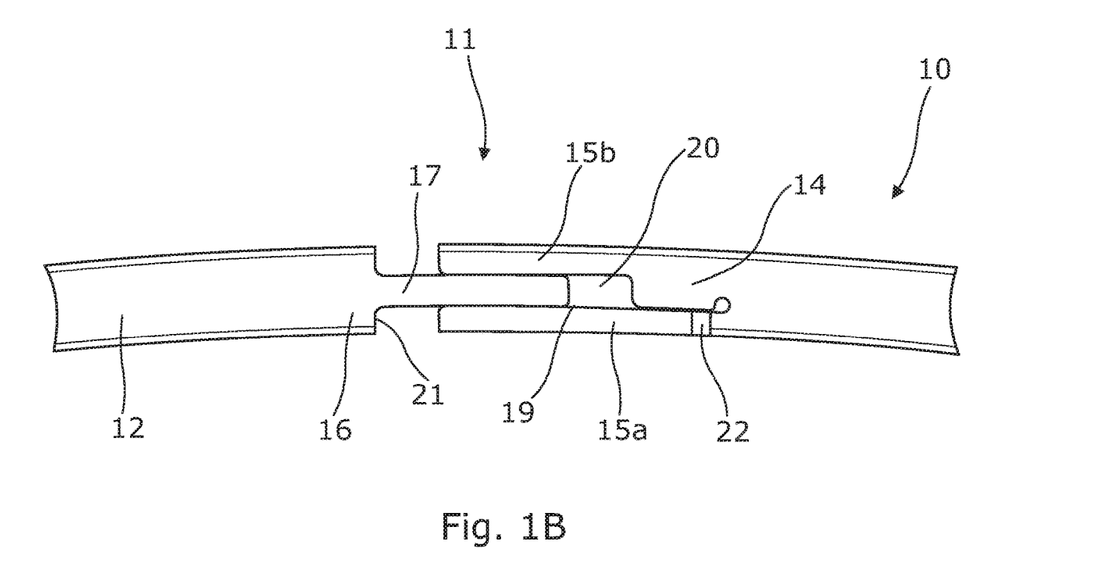

FIGS. 1A and 1B show a portion of a lower surface 12 of a single turn circular ring fastener 10, which in this example is a retaining ring. The retaining ring 10 comprises a discontinuous band 11 having a first end 14 and a second end 16. The first end 14 comprises a pair of spaced-apart elongate finger members 15a, 15b. The second end 16 comprises a single elongate tongue member 17. The finger members 15a, 15b and the tongue member 17 may also be referred to as tangs or tabs. The tongue member 17 is flanked by shoulder surfaces 21, due to the radial width of the tongue member 17 being less than the radial width of the band 11. The finger members 15a, 15b and tongue member 17 can interlock, such that in use the band 11 comprises a continuous and unbroken circumference (even though the ring itself is not formed of a strictly continuous band).

Figure 4A:
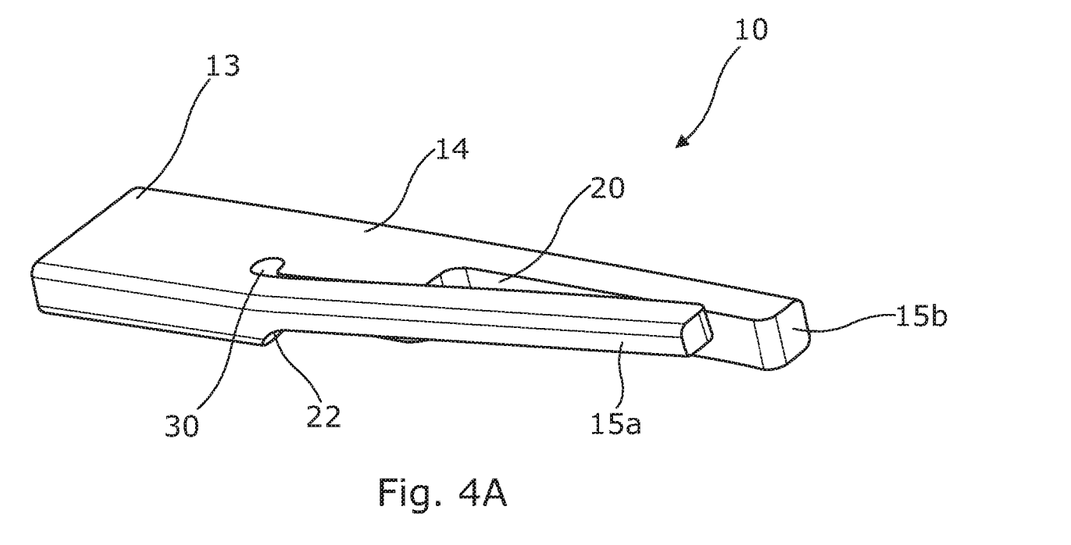
FIGS. 4A and 4B show axial and radial deflection of the first finger member, respectively, according to two different embodiments of the invention.
Figure 5A:
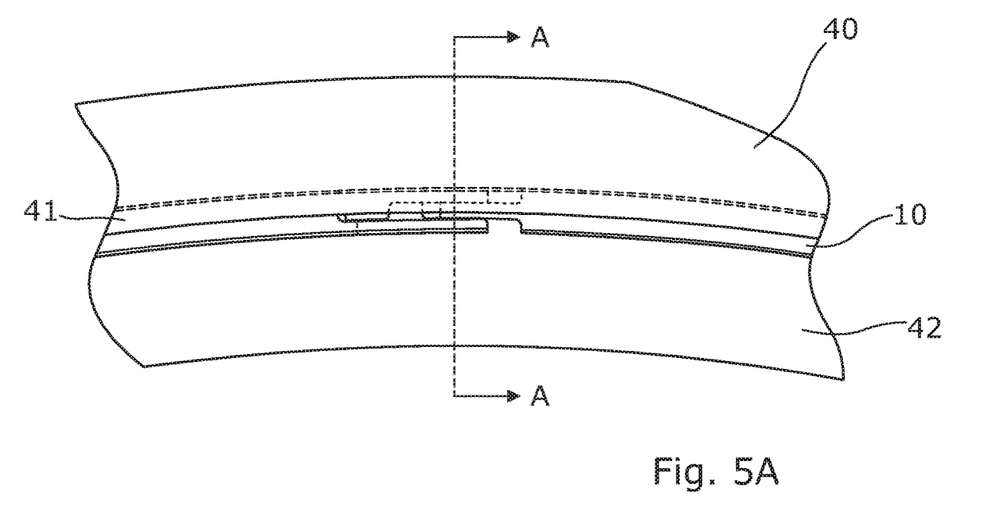
FIG. 5A shows a top view of the ring fastener installed within a bore, and securing a component within the bore, according to an aspect of the present invention.
Figure 5B:
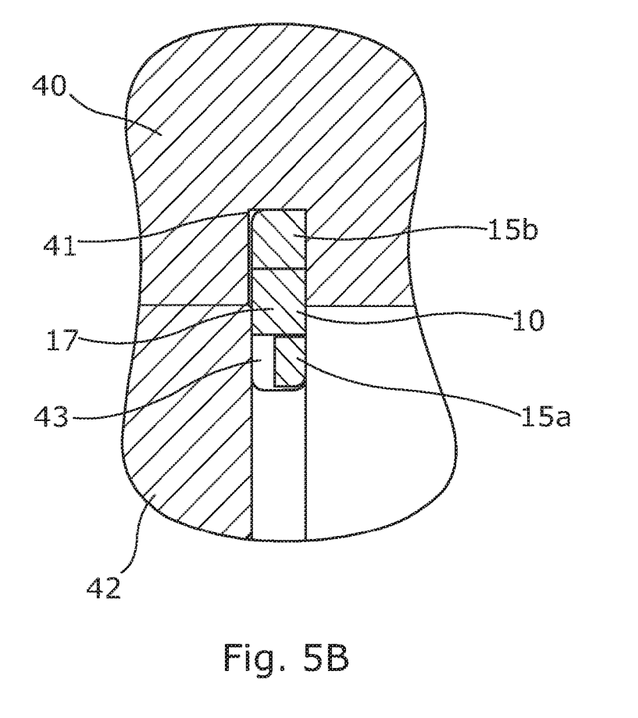
FIG. 5B shows a cross-section A-A through FIG. 5A.

As best shown in FIGS. 4A and 5B, a first finger member 15a is axially thinner than second finger member 15b, tongue member 17 and the remainder of the band 11. The upper circumferential surface of the finger members 15a, 15b and the upper circumferential surface 13 of the band 11 are flush. However, due to the smaller axial thickness, there is a shoulder 22 adjacent to and between the lower surface of finger member 15a and the first end 14 of the band 11. Typically, the dimensions of band 11 and first finger member 15a will depend on the material the ring 10 is made of, and the mechanical properties of that material. The dimensions must be chosen to ensure that the band 11 does not crack or break during use, and is sufficiently pliable and resilient to allow the band 11 to be manipulated during installation and use. Some suitable materials can include most metal alloys, such as nickel and cobalt super alloys, stainless steel, and carbon steel.

The finger members 15a, 15b are separated by a recess 19 which is wide enough to receive the tongue member 17. In use, the recess 19 allows circumferential movement (relative movement along the circumference of the band), but does not permit radial movement.

The length of each finger member 15a, 15b is designed to accommodate a pre-determined range of relative movement between the finger members 15a, 15b and the tongue member 17 when interlocked in use. This is achieved by the presence of a gap 20 between the terminal end 25 of tongue member 17 and a base of the recess 19. The range of movement will typically depend on the diameter of the ring 10, and also the operating temperatures of the system in which the ring 10 is installed. In some embodiments, the ring 10 may be designed to accommodate a range of movement associated with temperatures of 600-800 degrees Celsius.

Figure 3:
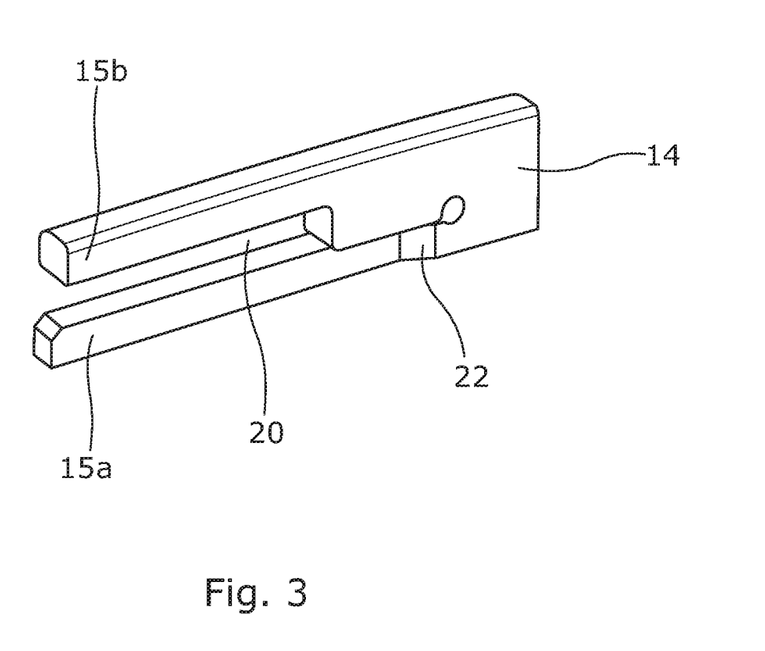
FIG. 3 shows a bottom view of the first end of the band of the ring fastener.
Figure 8:
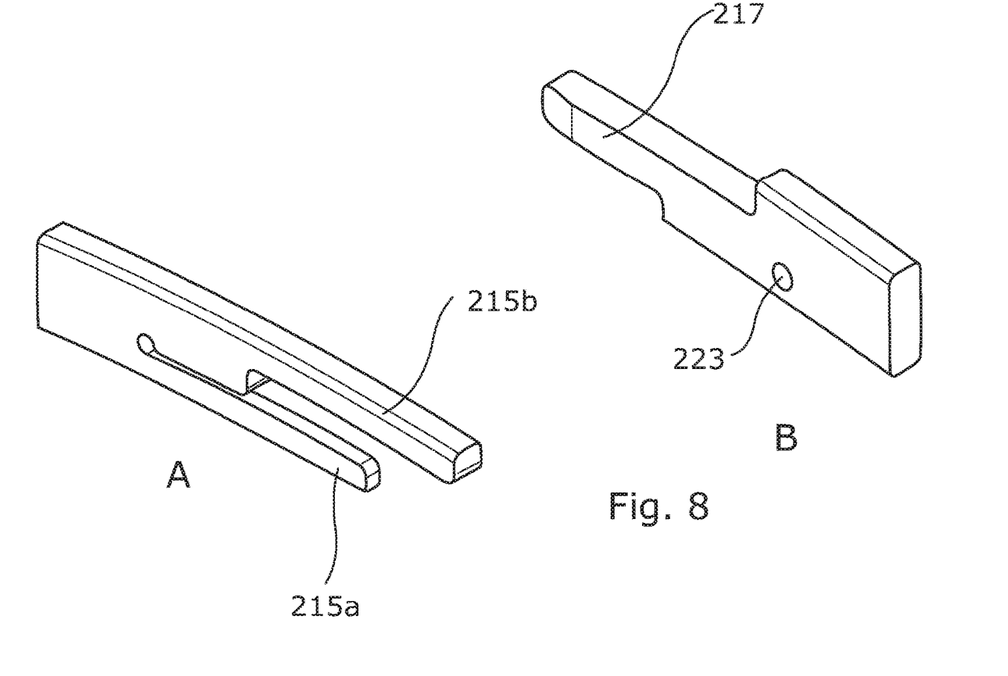
FIG. 8 shows a further embodiment of a ring fastener having a band with a first end (A) and a second end (B)
Figure 9:
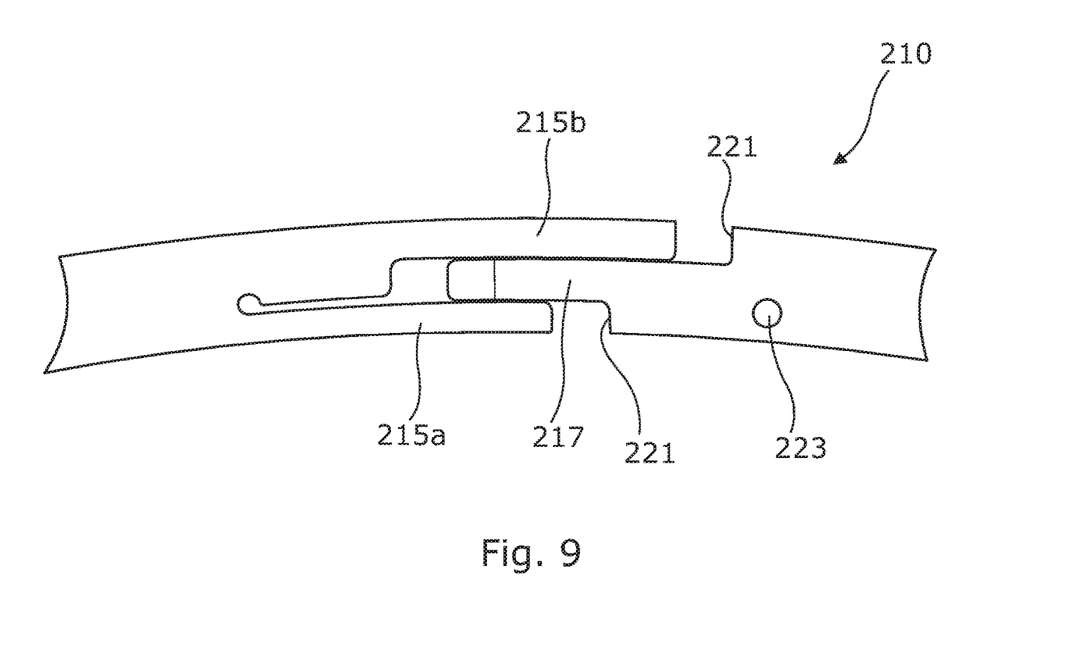
FIG. 9 shows the first and second ends of the FIG. 8 band in an interlocked position; and, FIG. 10 shows the full circumference of the FIGS. 8 and 9 ring fastener.
Figure 10:
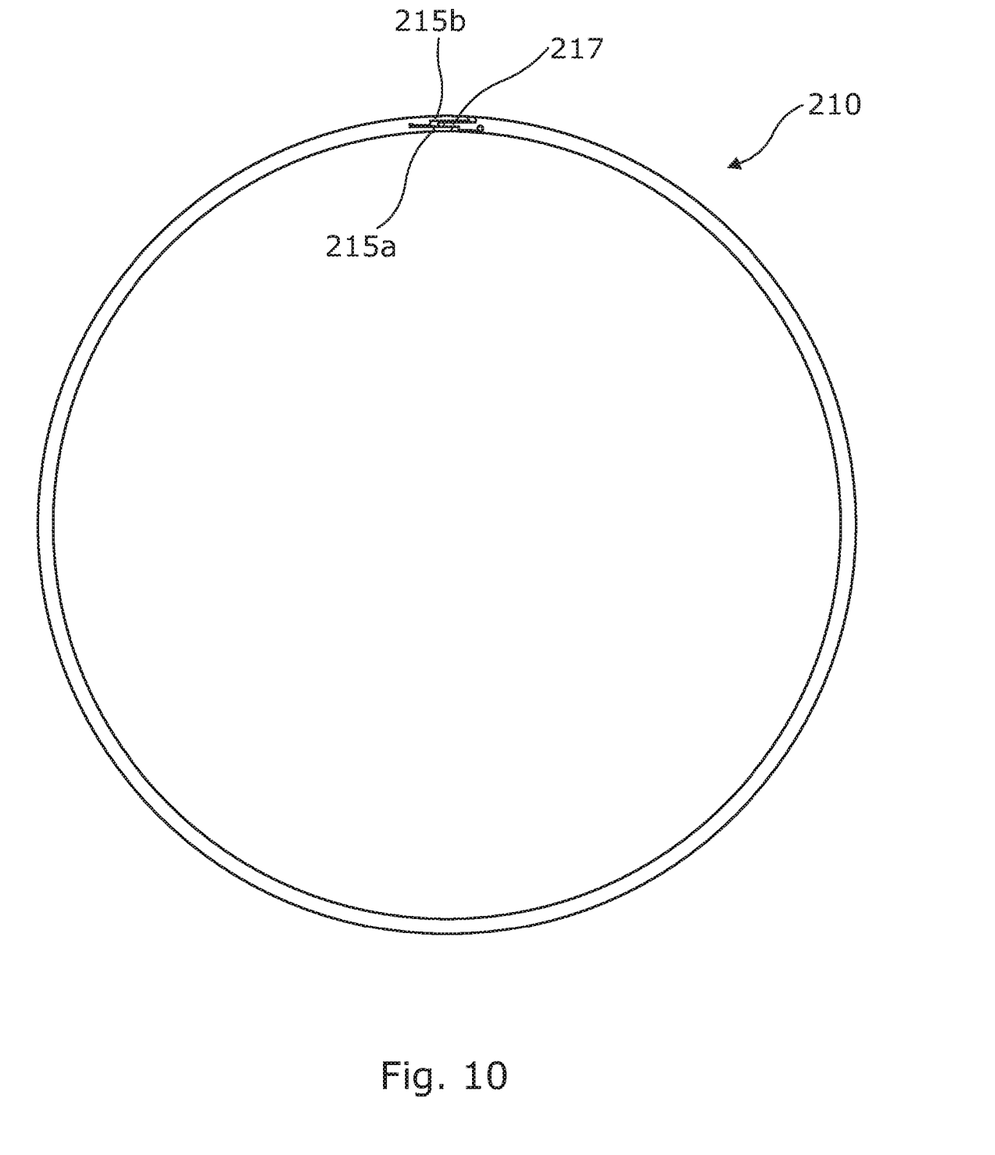

The finger members 15a, 15b, as shown in FIG. 3, are substantially the same length. As such, the shoulder surfaces 21 flanking tongue member 17 are circumferentially aligned. However, FIGS. 8-10 show another embodiment of the ring fastener 210 where the length of each finger member 215a, 215b is different. In this case, finger member 215a is shorter than finger member 215b. To accommodate this difference in length (and to accommodate a pre-determined range of relative movement), the shoulder surfaces 221 flanking tongue member 217 are circumferentially offset (as best seen in FIG. 10). As such, the side of the tongue member 217 adjacent to finger member 215b is longer than the side of the tongue member 217 adjacent to the shorter finger member 215a.

Figure 2:
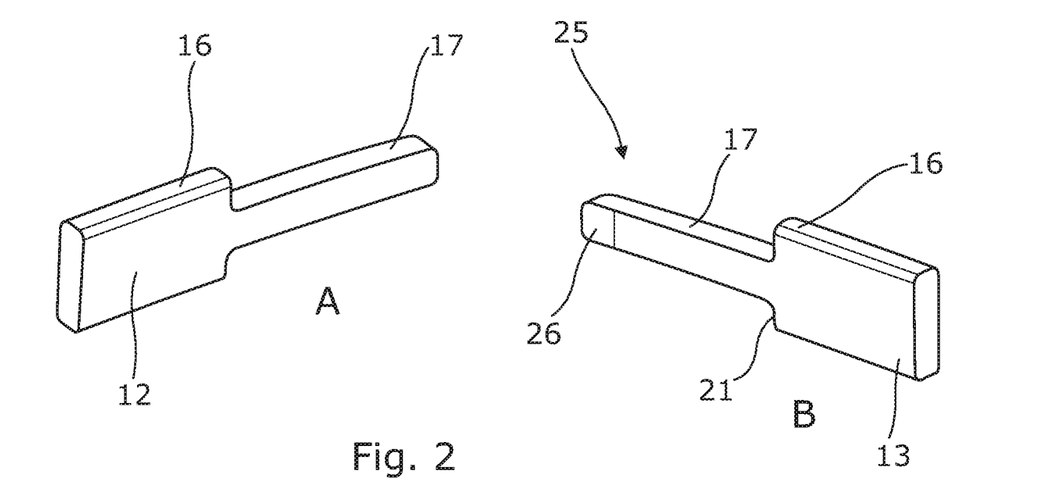
FIG. 2 shows a bottom (A) and top (B) view of the second end of the band of the ring fastener.

As shown in FIG. 2, the terminal end 25 of tongue member 17 has a chamfered portion 26 on its upper surface. As will be described in more detail below, the chamfered portion 26 allows for easier assembly of the retaining ring, as it can help to limit how much finger member 15a will need to bend in use.

Figure 4B:
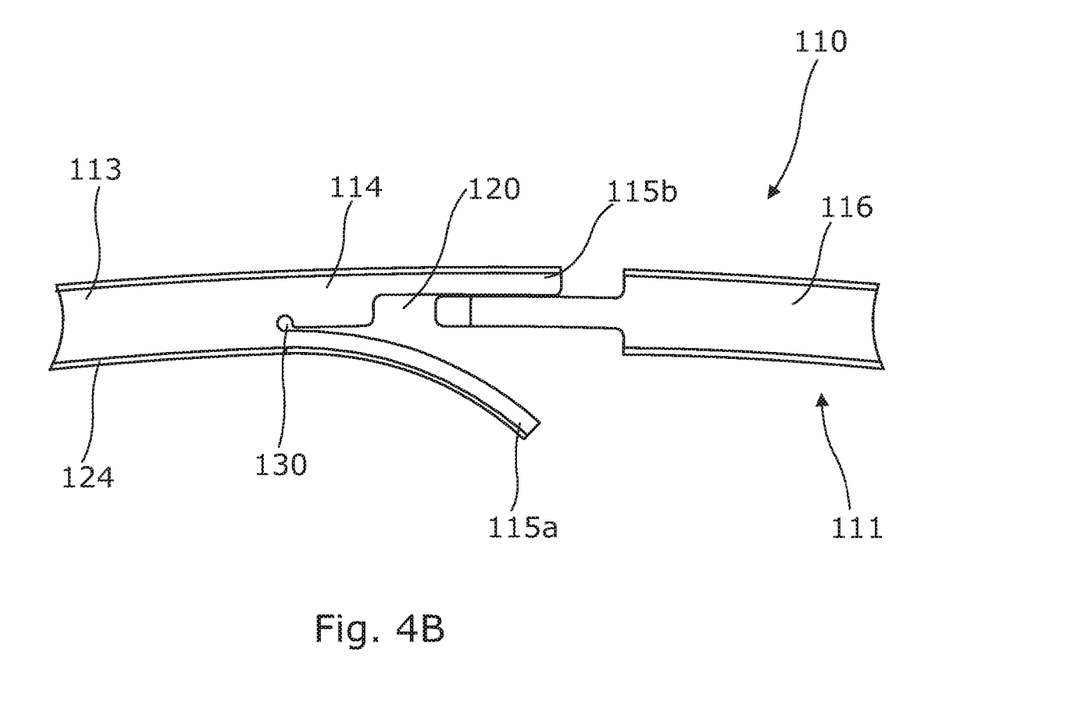

In use, the retaining ring 10 can move between an open and a closed configuration. The ring 10 shown in FIGS. 1A and 1B is in the closed configuration. The ring 10 is in the closed configuration when the finger members 15a, 15b and the tongue member 17 are substantially aligned with the outer circumferential surface 13 of the band 11. As shown in FIG. 4A, the ring 10 is in the open configuration when first finger member 15a is axially deflected (bent) from its substantially aligned position, to a position which is angled with respect to the outer circumferential surface 13 of the band 11. Alternatively, FIG. 4B shows an embodiment whereby the ring 110 is in the open configuration when the first finger member 115a is radially deflected from its substantially aligned position, to a position which is angled with respect to a side circumferential surface 124 of the band 111.

As an example of the ring 10 in use, FIGS. 5A and 5B show the ring 10 installed within a groove 41 of bore 40, to secure a component 42 within the bore 40 (the component is normally secured between a bore shoulder and the ring). This example will be described with reference to ring 10, as shown in FIG. 4A. However, it will be appreciated that ring 110 (as shown in FIG. 4B), or ring 210 (as shown in FIGS. 8-10), can be used instead.

The ring 10 is installed by first bending finger member 15a from a position substantially aligned with the outer circumferential surface 13 of the band 11, to a position where it is angled with respect to the band 11. For example, it can be deflected to a tangential position. Once in this position (with finger member 15a deflected), the band 11 is in the open configuration. Adjacent to the shoulder 22 is a hole 30 which provides relief from the stress/fatigue concentrations at the base of finger member 15a due to the bending motion during installation/removal of the band 11.

Figure 6:
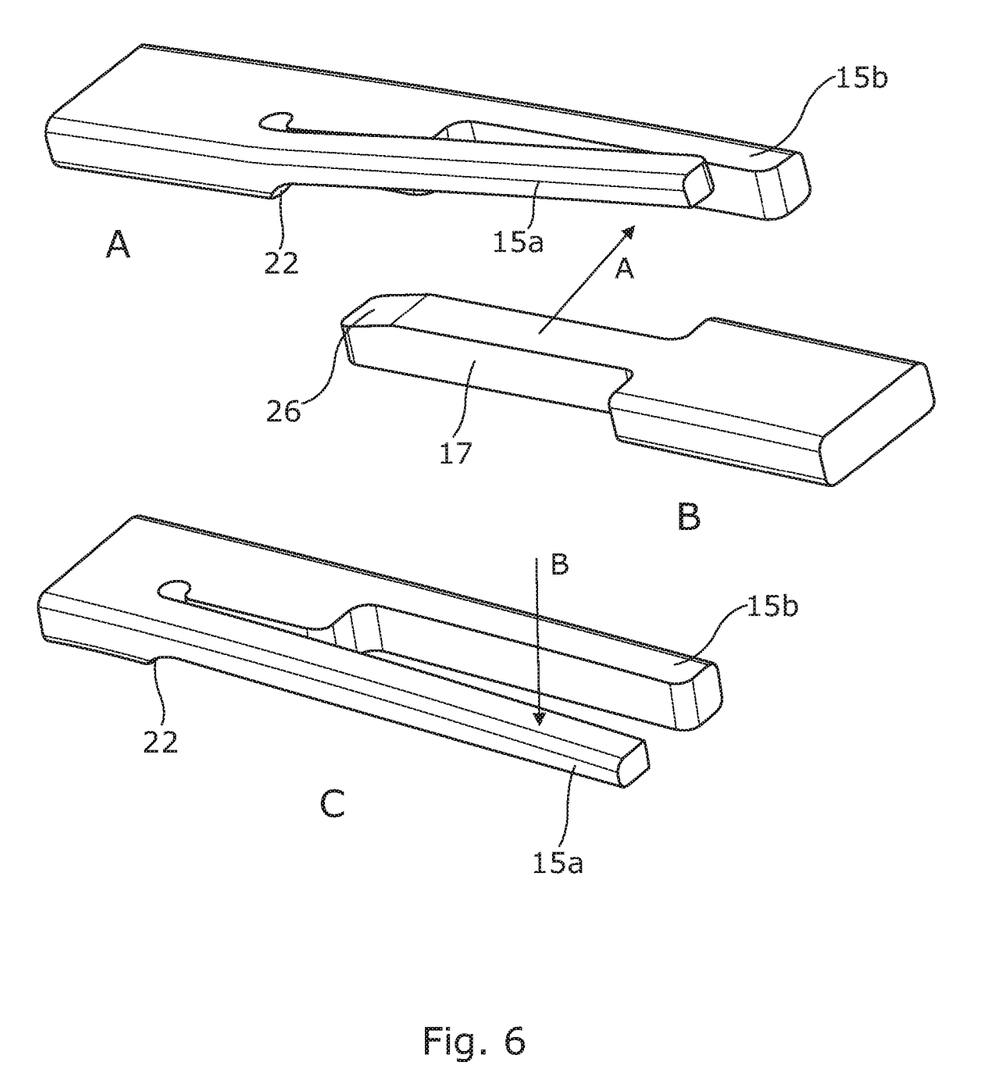
FIGS. 6A, 6B and 6C show the first and second ends of the band of the ring fastener being assembled in use.

Finger member 15b is then placed within the groove 41. As shown in FIG. 6A, the tongue member 17 is not initially located within the recess 19. Instead it can be located outwith the circumference of the band 11, adjacent and substantially parallel to finger member 15a.

As shown in FIG. 6B, with finger member 15a deflected, the tongue member 17 is radially moved (such as, by sliding it) underneath raised first finger member 15a and into recess 19 between finger members 15a, 15b (arrow A). The chamfered portion 26 makes it easier for the tongue member 17 to slide under finger member 15a without catching, thus making assembly more efficient. When in position, the tongue 17 is also partially located within groove 41 (as seen in FIGS. 5A and 5B).

Once in this position, finger member 15a can be pushed downwards (as shown by arrow B). In use, finger member 15a is moved (such as by pushing or hammering), downwards from the angled position. As shown in FIG. 6C, finger member 15a can be moved passed the position where it is substantially aligned/flush with the outer circumferential surface 13 of the band 11 (this is often referred to as over-bending), due to the reduced axial thickness of finger member 15a. As shown in FIG. 5B, when the applied force is removed, finger member 15a springs back into the position substantially aligned with the outer circumferential surface 13 of the band 11 (due in part to the shoulder 22 and the resilience of the band material).

The band 11 has now been returned to the closed position (with the tongue member 17 located within the recess 19). The tongue member 17 and finger members 15a, 15b are now interlocked, and the first and second ends 14, 16 are radially secured relative to each other. The tongue member 17 is also secured axially due to being partially located within groove 41.

The retaining ring 10 is now installed within the groove 41 of bore 40, and is able to secure the component 42 in place.

In an alternative embodiment using ring 210, finger member 215a will be deflected through the same angle as finger member 15a, but the terminal end of finger member 215a will be moved through a much shorter distance, due to its shorter length. This can help to make it easier to install the band in use.

In embodiments, one end of the band can be secured to component 42, such as via fixing hole 223 (shown in FIGS. 8 and 9), to help keep the ring fixed in place.

When interlocked, a gap 20 is formed between the terminal end 25 of tongue member 17 and the base of the recess 19. As described above, when in use, the gap 20 can accommodate any relative movement between the tongue member 17 and the finger members 15a, 15b in the circumferential direction. Relative movement between the finger members 15a, 15b and the tongue member 17 can be caused by thermal expansion and contraction due at least in part to rotational movement of the bore and/or the components mounted within the bore.

Since such movements are accommodated by the presence of the gap 20, the finger members 15a, 15b do not disengage from their interlocked position in use. Therefore, during use, the band 11 maintains a complete (unbroken) 360 degree circumference despite any fluctuations in the diameter of the band. As such, all sections of the component mounted within the bore have equal and uninterrupted support from the retaining ring 10.

As can be seen in FIG. 5B, the smaller axial thickness of finger member 15a means that a gap 43 is created between finger member 15a and a surface of the component 42. To uninstall the ring 10 from groove 41 of bore 40, the tip of a lever (such as a flathead screwdriver) can be inserted into this gap 43, and finger member 15a prised upwards. This will allow tongue member 17 to slide out from recess 19, and the ring 10 can then be removed from groove 41. Crucially, specialist equipment and skills are not required to install or remove ring 10.

Figure 7A:
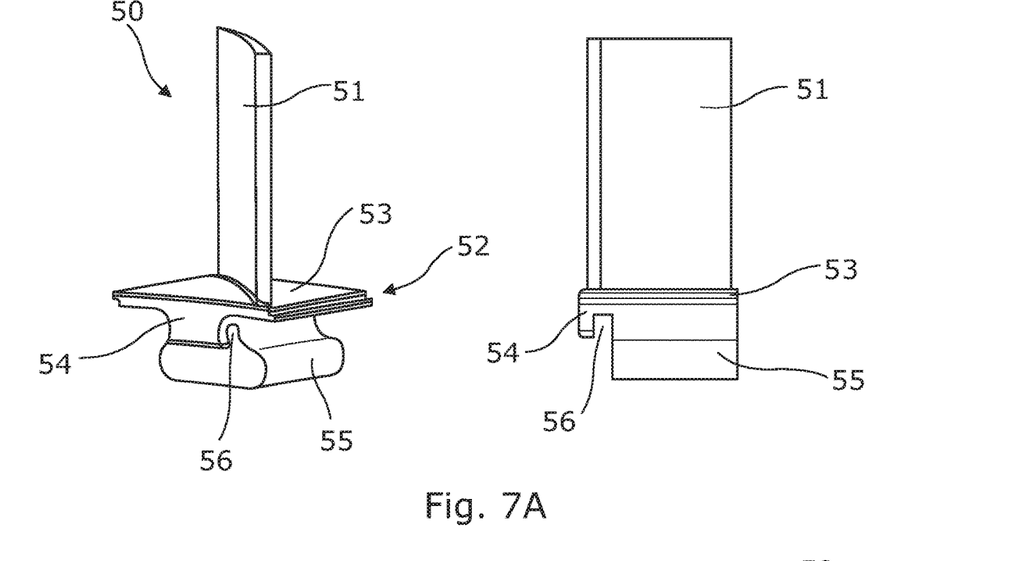
FIGS. 7A, 7B and 7C show the ring fastener securing turbine blades onto a turbine drum, in accordance with an aspect of the present invention.
Figures 7B, 7C:
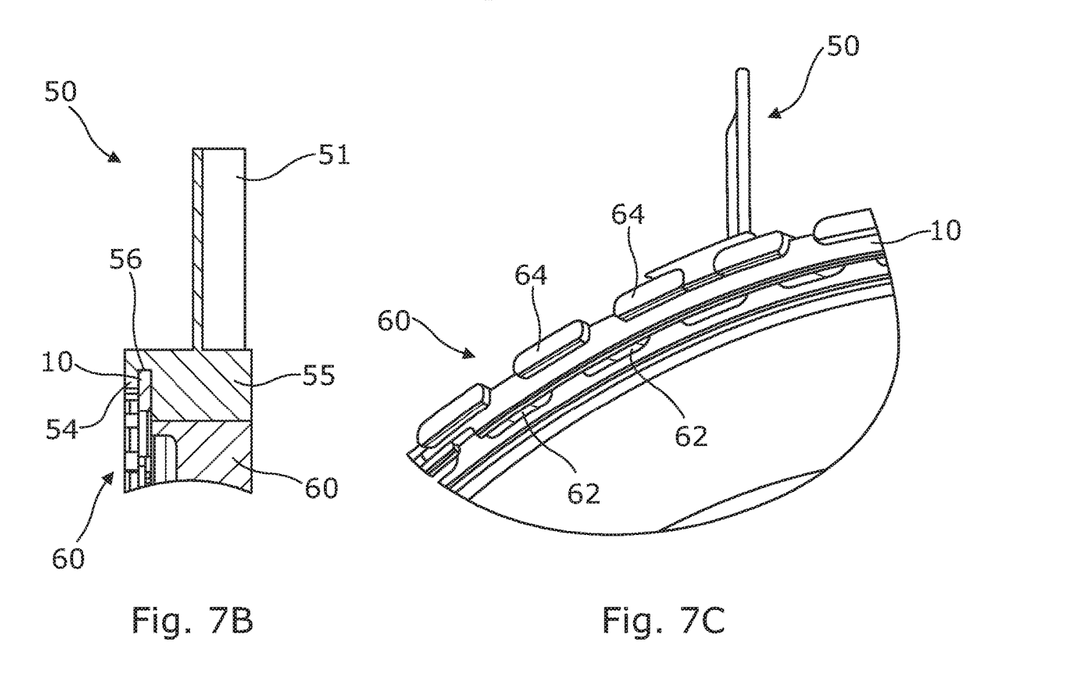

FIGS. 7A, 7B, and 7C, show another example, whereby the ring 10 is used to secure turbine blades 50 to a drum 60. FIG. 7A shows a perspective view and a side view of the turbine blade 50. Each turbine blade 50 comprises a blade portion 51 mounted to a base portion 52. The base portion 52 comprises a base plate 53 and a root portion 55. The base plate 53 comprises a first lip portion 54, which creates a first groove 56 between the lip 54 and the root portion 55.

The drum 60 has a circular cross-section, and comprises axially extending notches 62 positioned equidistantly around an outer circumferential surface of the drum 60. Each notch 62 is separated circumferentially by a second lip portion 64, defining a second groove between the second lip portions 64 and the drum 60.

In use, the root portion 55 of the turbine blade 50 slots into a notch 62. The shape of the notch 62 complements the shape of the root portion 55 (such as a conventional fir tree shape), such that the two interlock. As such, once interlocked, the turbine blade 50 is radially secured to the drum 60.

When interlocked, the first lip portions 54 are located between adjacent second lip portions 64, such that a continuous lip portion and groove is created around the circumferential edge of the drum 60. The ring 10 can then be installed within these grooves in the same manner as described above. Once installed, the turbine blades 50 are also axially secured to the drum 60.

Although the invention has been described above with reference to an exemplary embodiment, it will be appreciated that various changes or modifications can be made without departing from the scope of the invention as defined in the appended claims.

The invention claimed is:

1. A ring fastener comprising:
   a discontinuous band having a first end and a second end;
   the first end comprising a pair of spaced-apart elongate finger members, and the second end comprising an elongate tongue member;
   wherein the finger members and the tongue member are adapted to interlock, such that when interlocked, the band comprises a continuous circumference;
   wherein the pair of spaced-apart elongate finger members comprises a first finger member and a second finger member; and,
   wherein the ring fastener further comprises:
   a closed configuration wherein the finger members and the tongue member are substantially aligned with a circumferential surface of the band; and,
   an open configuration wherein the first finger member is radially or axially deflected from its substantially aligned position, so that it is angled with respect to the circumferential surface of the band.

2. A ring fastener as claimed in claim 1, wherein in the open configuration the second end is radially moveable relative to the first end to a position where the tongue member is located between the pair of elongate finger members; and in the closed position, the first and second ends are radially secured relative to each other.

3. A ring fastener as claimed in claim 1, wherein the first finger member is thinner than the second finger member, the tongue member and the band.

4. A ring fastener as claimed in claim 3, wherein a shoulder portion is adjacent to the thinner first finger member and the first end of the band.

5. A ring fastener as claimed in claim 1, wherein a terminal end of the tongue member has a chamfered portion.

6. A ring fastener as claimed in claim 1, wherein a recess is defined by the pair of spaced-apart finger members, the tongue member being receivable within the recess; and
   wherein when the finger members and the tongue member are interlocked, a gap is defined between the end of the tongue member located within the recess, and a base of the recess.

7. A ring fastener as claimed in claim 6, wherein the length of each member is adapted to accommodate a predetermined range of relative circumferential movement, such that the tongue member remains engaged in the recess over the range to maintain a complete band circumference.

8. A ring fastener as claimed in claim 1, wherein the first finger member and the second finger member are substantially the same length.

9. A ring fastener as claimed claim 1, wherein the first finger member and the second member are different lengths.

10. A ring fastener as claimed in claim 1, wherein the band is substantially circular.

11. A ring fastener as claimed in claim 1, wherein the ring fastener is a retaining ring.

12. An assembly comprising:
    an elongate bore having a substantially circular cross-section, and a groove extending circumferentially around an inner surface of the bore;
    a component located within the bore; and,
    wherein the ring fastener of claim 1 is received within the groove to secure the component axially relative to the bore.

13. A method of assembling the bore and component of claim 12, the method comprising the steps of:
- axially or radially deflecting the first finger member from a position substantially aligned with the circumferential surface of the band; and,
- installing the band within the groove on the inner surface of the bore, by:
  - locating the second finger member within the groove;
  - radially moving the tongue member and the first finger member relative to each other, such that the tongue member is located between the first and second finger members; and,
  - returning the first finger member to the position where it is substantially aligned with the circumferential surface of the band, to radially secure the tongue member between the first and second finger members.

14. The method as claimed in claim 13, wherein returning the first finger member to the position where it is substantially aligned with the circumferential surface of the band includes axially over-bending the first finger member.

15. A method of forming the assembly of claim 12, comprising:
- arranging the pair of spaced-apart finger members so as to define a recess between them which receives the tongue member; and,
- interlocking the finger members and the tongue member so as to define a gap between the end of the tongue member located within the recess, and the base of the recess; and,
- wherein the gap accommodates any relative circumferential movement between the tongue member and the finger members, such that the band maintains a complete circumference during use.

16. The method of claim 15, further including permitting the relative circumferential movement caused by thermal expansion and contraction due at least in part to rotational movement of the bore or component located within the bore.

17. A turbine assembly comprising:
- a drum having a substantially circular cross-section, and having a plurality of discrete axially extending notches positioned equidistantly around an outer circumferential surface of the drum;
- each notch separated circumferentially around the drum by a first retaining portion located on the circumferential edge of the drum;
- a turbine blade interlocked with each notch, such that each turbine blade is radially secured relative to the drum;
- each turbine blade comprising a second retaining portion, each second retaining portion being positioned between adjacent first retaining portions, and aligned with the adjacent first retaining portions; and,
- wherein the ring fastener of claim 1 is received by the first and second retaining portions to secure the turbine blades axially relative to the drum.

18. A turbine assembly as claimed in claim 17, wherein the first or second retaining portions is a lip or a groove.

* * * * *